UNITED STATES PATENT OFFICE.

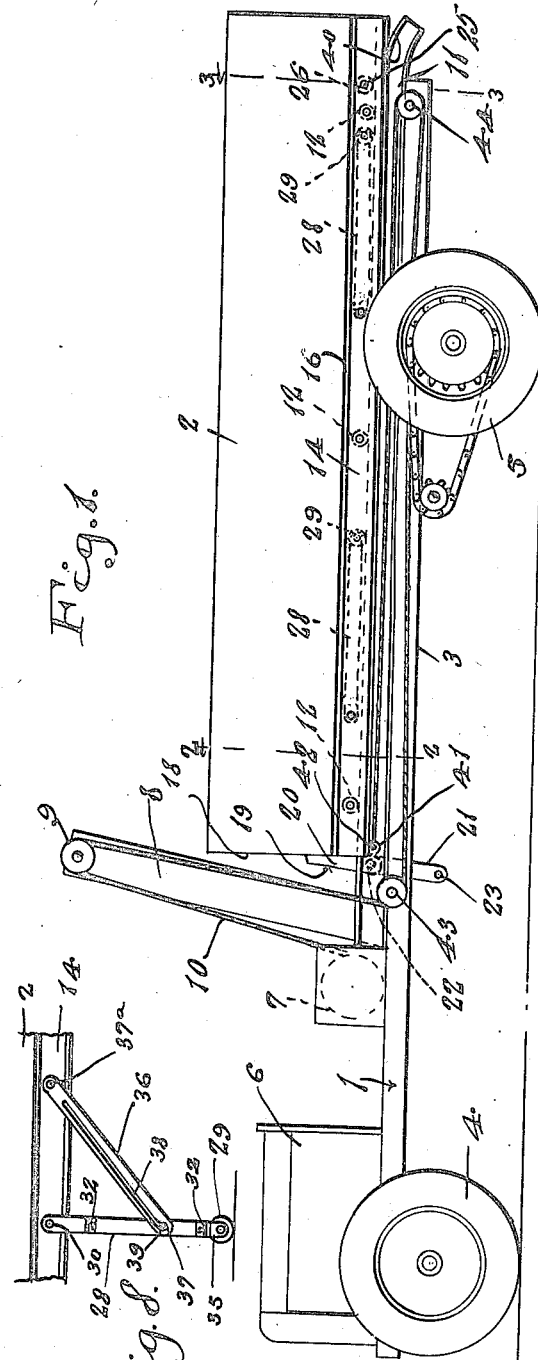
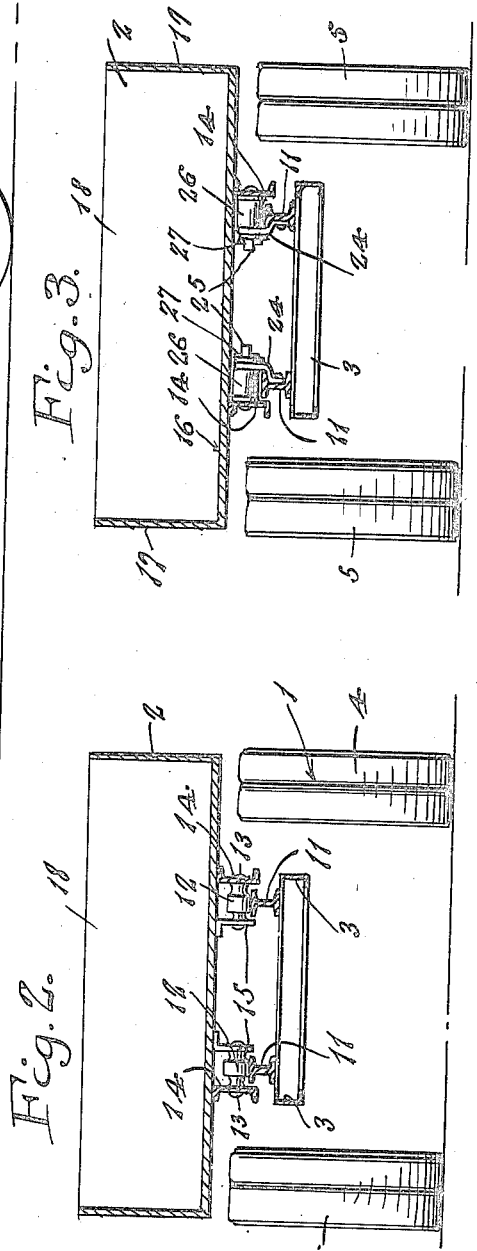

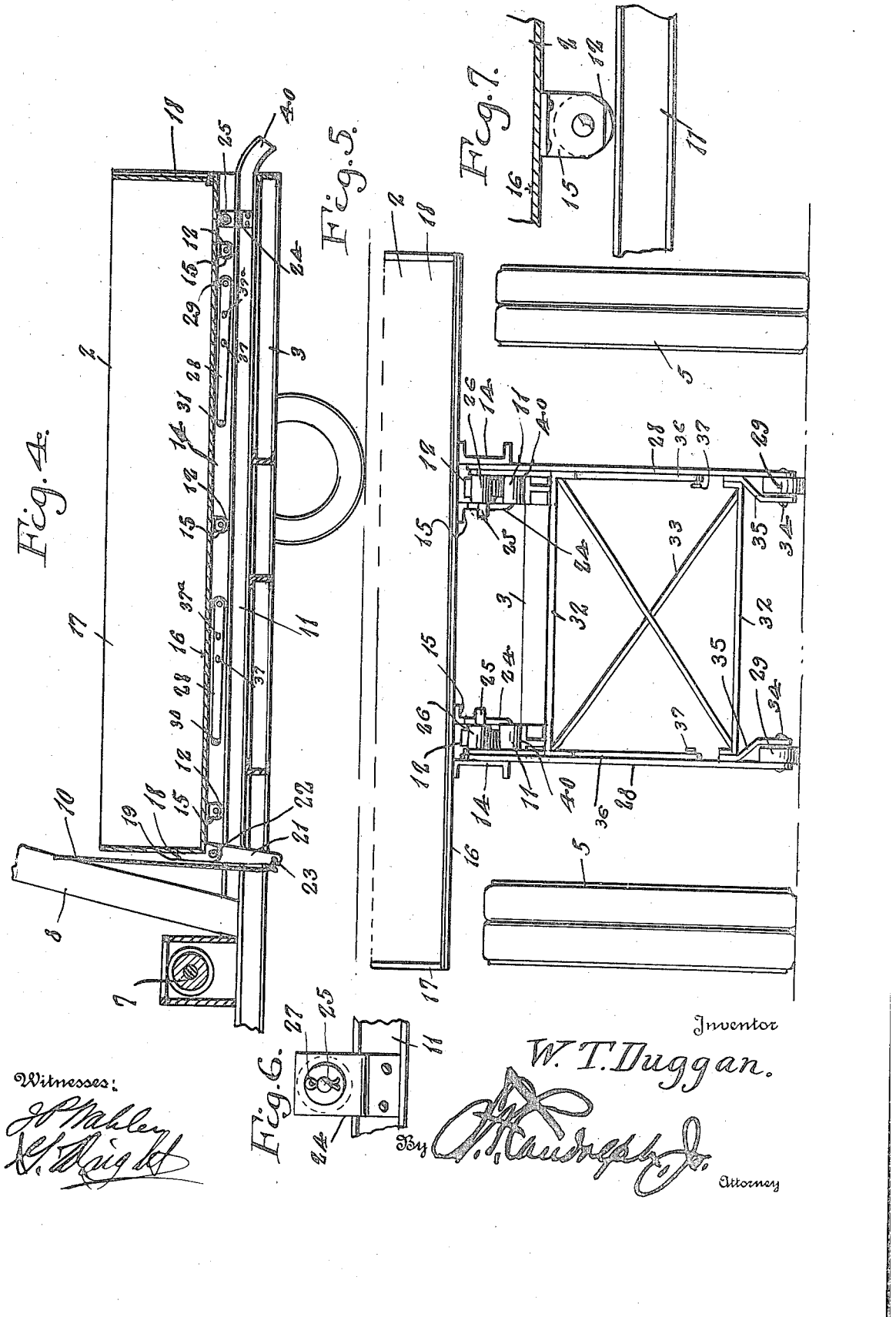

WILLIAM T. DUGGAN, OF CLEVELAND, OHIO.

INTERCHANGEABLE AND REMOVABLE TRUCK-BODY.

1,269,265.　　　　　Specification of Letters Patent.　　Patented June 11, 1918.

Application filed September 25, 1917. Serial No. 193,115.

*To all whom it may concern:*

Be it known that I, WILLIAM T. DUGGAN, a citizen of the United States, residing at Cleveland, in the county of Cuyahoga and State of Ohio, have invented certain new and useful Improvements in Interchangeable and Removable Truck-Bodies; and I do hereby declare the following to be a full, clear, and exact description of the invention, such as will enable others skilled in the art to which it appertains to make and use the same.

This invention relates to vehicles and more particularly to motor trucks, and the primary object of the invention is the provision of a plurality of detachable and interchangeable bodies for a motor truck chassis, so that one of the bodies can be loaded with material, while the truck is hauling another body, thus saving time, expense and labor.

Another object of the invention is the provision of a plurality of interchangeable flat truck bodies for a motor truck chassis having a plurality of rollers mounted thereon for engaging I beams mounted on the chassis, so that the body can be conveniently rolled on and off the chassis.

A further object of the invention is the provision of a plurality of foldable legs mounted on the truck body having rollers on their lower ends, whereby the bodies can be removed from the chassis and supported in an elevated position and moved from one place to another.

A still further object of the invention is the provision of a plurality of interchangeable flat bodies for a dump motor truck having means for moving the bodies off and on the chassis.

A still further object of the invention is the provision of means for automatically moving the supporting legs downwardly in their extended position when the body is removed from the chassis.

A still further object of the invention is to provide a device of the above character, which is durable and efficient in use, and one that is simple and easy to manufacture, and one that can be placed upon the market at a reasonable price.

With these and other objects in view, the invention consists in the novel construction, formation and arrangement of parts as will be hereinafter more specifically described and claimed, and illustrated in the accompanying drawings, forming a part thereof in which:

Figure 1 is a side elevation of a motor dump truck having a body mounted thereon constructed in accordance with this invention, Fig. 2 is a transverse section taken on the line 2—2 of Fig. 1, Fig. 3 is a transverse section taken on the line 3—3 of Fig. 1, Fig. 4 is a fragmentary longitudinal section through the truck and body, Fig. 5 is an end elevation of the truck and body, Fig. 6 is a detail side elevation showing one of the rollers and the means for locking the body to the chassis, Fig. 7 is a fragmentary side elevation showing one of the rollers engaging the I beams of the chassis, and Fig. 8 is a side elevation of one of the supporting legs in its lowered position.

Referring to the drawings in detail, wherein similar reference numerals designate corresponding parts throughout the several views, the numeral 1 generally indicates the improved motor dump truck having a body 2 positioned thereon. The motor truck 1 includes a chassis 3, the front wheels 4, the driving wheel 5 and the engine 6. The chassis 3 has mounted thereon, a hoisting drum 7, which is operatively connected to the driving shaft (not shown) by a suitable clutch, (not shown). The hoisting column 8 includes the pulley 9 and a hoisting cable 10, which extends from the winding drum 7 over the pulley 9 down to the body. Secured to the chassis 3 and extending longitudinally of the same is a pair of spaced I beams 11, which receive the rollers 12 carried by the body 2. The rollers 12 are rotatably supported on pins 13 carried by the depending beams 14, which extend the whole length of the body, and lugs 15 which form brackets. The beams 14 and lugs 15 are secured to the under surface of the body and positioned on each side of the I beams 11 and extend slightly below the upper surface of the same and form means for preventing any lateral movement of the body with relation to the chassis 3.

The body 2 is formed in accordance with the flat body type and consists of a flooring 16, the side walls 17 and the end walls 18. A hoisting arm 19 is secured to the central portion of the forward end wall 18 and is preferably formed of two sections 20 and 21 which are hingedly connected together as at 22. The section 21 projects below the under surface of the floor of the body 2 and has an eye 23 formed in its free end, which is adapted to detachably receive the free end of the hoisting cable 10. The arm 20 as shown in Figs. 1 and 4 is in its extended position and the section 21 cannot be thrown back any farther, but when the body is to be removed from the chassis, the section 21 is swung upwardly away from the hoisting drum to the under surface of the body.

Adjacent the rear end of the I beams, are secured upwardly extending brackets 24, which are suitably apertured and the apertures detachably receive the free ends of the pins 25, which support the rollers 26. The outer ends of the pins 25 are carried by the beams 14. Cotter pins 27 extend through apertures formed in the free ends of the pins 25 and hold the same in position. The pins 25 hold the body 2 on the chassis and also form a suitable pivot for the body when the same is to be dumped. When it is desired to remove the body from the chassis, the pins 25 are slid from the apertures in the brackets 24, which allows the body to be rolled off of the chassis.

Pivotally secured to the beams 14 are legs 28, which rotatably carry rollers 29 at their free lower ends for engagement with the ground. The legs 28 are arranged in pairs and one of the pairs are secured adjacent the front end of the body 2 by means of pivot pins 30, and the other pair is secured at the rear end of the body by pivot pins 31. Suitable cross braces 32 extend from one leg to the other and the cross braces are connected by diagonal brace rods 33, thus a rigid brace structure is formed for the legs. The rollers 29 are mounted on pins 34, which have one of their ends journaled in the leg and the opposite end in a bracket 35 secured to the leg. Suitable braces 36 are pivoted to the inner sides of the beams 14 and are connected to the legs 28 by means of pivot pins 37 which are rigidly secured to the legs and extend through a slot 38 formed in the braces. A notch 39 is formed at the lower end of the slot 38 and receives and holds the pin 37 when the legs are in extended position. The rollers 29 rest on the top of the I beams 11, which are curved downwardly at their outer ends as at 40 and as the body 2 is pulled off of the chassis, the legs 28 drop downwardly in their extended position by their own weight.

A suitable bracket 41 having an eye 42 formed therein, is secured to the inner sides of the body 2 and when the body is to be pulled on the chassis, the hoisting cable 10 is detached from the hoisting arm 20 and is passed around a guide roller 43 and is detachably secured to bracket 41, which when the drum is operated will efficiently pull the body off of the chassis. When it is desired to push the body off of the chassis, the hoisting cable 10 is detached from the hoisting arm 20 and is passed around the guide pulley 43 and around the guide pulley 44 secured to the chassis adjacent the rear end thereof, and then to the bracket 41.

From the foregoing description, it can be seen that an improved motor truck has been provided, which is adapted to detachably receive a plurality of bodies, so that while one body is being loaded, another body can be emptied.

My invention has been shown applied to a dump motor vehicle but it is to be understood that the same can be applied to any type of motor truck.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What I claim is:

1. In a device of the class described, the combination with a motor truck chassis having a pair of spaced I beams secured thereto, of a body detachably associated with the chassis, rollers mounted on the under surface of the body and positioned on top of the I beams, legs pivotally secured to the under surface of the body and adapted to engage the I beams, said legs being adapted to drop down in an extended position by their own weight when the body is removed from the chassis.

2. In a device of the class described, the combination with a motor truck chassis having a pair of spaced I beams secured longitudinally on the same, and a body detachably associated with the chassis, rollers rotatably carried by the under surface of the body and positioned on the top of the I beams, legs pivotally carried by the under surface of the body, rollers mounted on the free ends of the legs, said rollers adapted to engage the I beams, and means to lock said body on the chassis.

3. In a device of the class described, the combination with a motor truck chassis having a pair of spaced I-beams secured longitudinally on the same, of a body detachably associated with the chassis, rollers rotatably carried by the under surface of the body and positioned on top of the I-beams, legs pivotally carried by the under surface of the body, rollers mounted on the free ends of the legs and adapted to engage the I-beams, said I-beams extending rearwardly of the chassis and having their free ends curved downwardly, as and for the purpose specified.

In testimony whereof I affix my signature in presence of two witnesses.

WILLIAM T. DUGGAN.

Witnesses:
J. J. CLURZ,
C. W. FITCH.